(12) United States Patent
Reynolds et al.

(10) Patent No.: US 12,045,294 B2
(45) Date of Patent: Jul. 23, 2024

(54) MASK-AUGMENTED INVERTED INDEX

(71) Applicant: Microsoft Technology Licensing, LLC., Redmond, WA (US)

(72) Inventors: Patrick Alexander Reynolds, Chapel Hill, NC (US); Gregory Scott Orzell, Mainz (DE); Vicent Pere Marti Guardiola, Madrid (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 17/099,296

(22) Filed: Nov. 16, 2020

(65) Prior Publication Data

US 2022/0156329 A1 May 19, 2022

(51) Int. Cl.
*G06F 16/00* (2019.01)
*G06F 16/2453* (2019.01)
*G06F 16/951* (2019.01)
*G06F 16/953* (2019.01)

(52) U.S. Cl.
CPC ...... *G06F 16/951* (2019.01); *G06F 16/24545* (2019.01); *G06F 16/953* (2019.01)

(58) Field of Classification Search
CPC . G06F 16/951; G06F 16/24545; G06F 16/953
USPC .................................................. 707/600–899
See application file for complete search history.

(56) References Cited

U.S. PATENT DOCUMENTS

| | | |
|---|---|---|
| 6,349,308 B1 | 2/2002 | Whang et al. |
| 2006/0018551 A1 | 1/2006 | Patterson |
| 2018/0101528 A1* | 4/2018 | Patterson ............ G06F 16/9538 |
| 2018/0218037 A1 | 8/2018 | Marquardt et al. |
| 2018/0253460 A1* | 9/2018 | Goel .................... G06F 40/284 |

OTHER PUBLICATIONS

He et al., Read as Needed: Building WiSER, a Flash-Optimized Search Engine, 2020, Usenix, Feb. 25-27, 2020, pp. 59-77 (Year: 2020 ) (Year: 2020).*

He et al., Read as Needed: Building WiSer, a Flash-optimized Search Engine, 2020, Usenix, Feb. 25-27, 2020, pp. 59-77 (Year: 2020).*

(Continued)

*Primary Examiner* — Irete F Ehichioya
*Assistant Examiner* — Shirley D Hicks
(74) *Attorney, Agent, or Firm* — Workman Nydegger

(57) ABSTRACT

The embodiments disclosed herein are related to a computing system for generating a mask-augmented inverted index. The mask-augmented inverted index is structured to allow phrase query searching while minimizing the amount of computing system processing and memory resources needed to generate the mask-augmented inverted index. In one embodiment, a first token is mapped to a first listing of documents that include the first token. A first mask is included that comprises a probabilistic representation of a set of integers corresponding to one or more locations of the first token in each of the individual documents of the first listing. A second mask is included that comprises a probabilistic representation of a set of integers that indicate a positional relationship between the first token and one or more other tokens in each of the individual documents of the first listing.

17 Claims, 13 Drawing Sheets

(56) References Cited

OTHER PUBLICATIONS

He, et al., "Read as Needed: Building WISER, a Flash-Optimized Search Engine", In Proceedings of 18th USENIX Conference on File and Storage Technologies, Feb. 25, 2020, pp. 59-73.

"International Search Report and Written Opinion Issued in PCT Application No. PCT/US21/052488", dated Jan. 18, 2022, 11 Pages. (MS# 409016-WO-PCT).

"Inverted Indexing for Text Retrieval", Retrieved from://web.archive.org/web/20130515015015/http:/www.dcs.bbk.ac.uk/~dell/teaching/cc/book/ditp/ditp_ch4.pdf, May 15, 2013, 21 Pages.

"RediSearch Technical Overview", Retrieved from: https://web.archive.org/web/20200709110523/https:/oss.redislabs.com/redisearch/Overview/, Jul. 9, 2020, 17 Pages.

Asadi, et al., "Fast, Incremental Inverted Indexing in Main Memory for Web-Scale Collections", In Repository of arXiv:1305.0699v1, May 3, 2013, 10 Pages.

Heo, et al., "IIU: Specialized Architecture for Inverted Index Search", In Proceedings of the Twenty-Fifth International Conference on Architectural Support for Programming Languages and Operating Systems, Mar. 16, 2020, pp. 1233-1245.

Zhao, Yan, "Omnisearch Index Formats", Retrieved from: https://blog.twitter.com/engineering/en_us/topics/ infrastructure/2016/omnisearch-index-formats.html, Nov. 4, 2016, 10 Pages.

\* cited by examiner

MASK-AUGMENTED INVERTED INDEX

BACKGROUND

Existing computing technologies provide for search engines for searching documents in a database or network such as the Internet for desired search terms often referred to as tokens. In these technologies, many types of search engines use a data structure called an inverted index to quickly identify documents that contain the one or more tokens that a user is searching for. An inverted index maps each token to a list of the locations in various documents where that token appears. Each such location is called a posting, and the list of all postings for a token is a posting list. Searches for a single token can simply return the full posting list for that token. Searches for multiple tokens often return an intersection of the posting lists for those tokens.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing computing technologies provide for search engines for searching documents in a database or network such as the Internet for desired search terms often referred to as tokens. In these technologies, many types of search engines use a data structure called an inverted index to quickly identify documents that contain the one or more tokens that a user is searching for. An inverted index maps each token to a list of the locations in various documents where that token appears. Each such location is called a posting, and the list of all postings for a token is a posting list. Searches for a single token can simply return the full posting list for that token. Searches for multiple tokens often return an intersection of the posting lists for those tokens.

Two common types of inverted index are a document-ID index and a positional index. A document-ID index stores one posting for each document (e.g., a web page, source code file, line within a log file, etc.) that contains a given token at least once. A document-ID index is thus fairly compact. However, a document-ID index cannot support phrase queries, where a user searches for a sequence of tokens that must appear adjacent to each other. Accordingly, the document-ID index identifies many candidate documents that contain the correct tokens, but not in the correct sequence. The candidate documents must then be filtered by loading each candidate document from storage and scanning it to check if it contains the right token sequence. The loading and scanning is mostly wasted work and produces slower responses to users, limiting the practical size of their index to around 1 GB—about the size of a single software project. In addition, the loading and scanning uses a large amount of processing resources to filter the candidate documents and a large amount of network resources when loading the candidate documents for the filtering.

The second common type of inverted index is a positional index, which stores the document ID and the position (offset) within the document of each token. If a token appears 100 times in ten documents, it will have 100 entries in the index (in a document-ID index, it would have only ten entries: one per document). A positional index supports phrase queries, but at a much higher storage cost than a document-ID index. The added storage cost depends on the size and repetitiveness of documents within the index. For source-code files averaging 7 KB, a positional index is 10× the size of a document-ID index. For log files, the ratio is smaller, but still likely to be at least 2×.

Accordingly, the most common types of existing search engines either cannot perform phrase queries or require large amounts of storage resources to support the related index. Alternatively, they may also require a large amount of computing and network resources to perform the search.

The embodiments described herein aim to solve at least some of the above-mentioned problems by providing a computing system for generating a mask-augmented inverted index. The mask-augmented inverted index is structured to allow phrase query searching while minimizing the amount of computing system processing and storage resources needed to generate the mask-augmented inverted index. In one embodiment, a first token is mapped to a first listing of documents that include the first token. A first mask is included that comprises a probabilistic representation of a set of integers corresponding to one or more locations of the first token in each of the individual documents of the first listing. A second mask is included that comprises a probabilistic representation of a set of integers that indicate a positional relationship between the first token and one or more other tokens in each of the individual documents of the first listing.

In an embodiment, a second token is mapped to a second listing of documents that include the second token. A third mask is included that comprises a probabilistic representation of a set of integers corresponding to one or more locations of the second token in each of the individual documents of the second listing. A fourth mask is included that comprises a probabilistic representation of a set of integers that indicate a positional relationship between the second token and one or more other tokens in each of the individual documents of the first listing.

In an embodiment, the one or more locations are file offset locations of the first token or second token in each of the documents of the first listing or second respectively. In another embodiment, the one or more locations are line numbers where the first token or the second token is located in each of the documents of the first listing or the second listing respectively.

In an embodiment, the first and second token is a whole word. In another embodiment, the first and second token is a sequence of characters. In the embodiment, the sequence of characters is one of a bigram, a trigram, a 4-gram, an n-gram, a sequence of ASCII characters, a sequence of Unicode characters, or a UTF-8 sequence. In another embodiment, the positional relationship between the first token and the one or more other tokens is immediately adjacent to or following the first token in each individual document of the first listing. In another embodiment first and second masks are Bloom filters implemented as four bit arrays. In an embodiment, each individual document of the first and second listing of documents are one of source code files, web pages, emails, books, log files, office documents, or individual lines in a log file or a source code file.

In an embodiment, a first listing of documents is accessed that include a first token, a first mask that comprises a probabilistic representation of a set of integers corresponding to one or more locations of the first token in each of the individual documents of the first listing, and a second mask that comprises a probabilistic representation of a set of integers that indicate a positional relationship between the first token and one or more other tokens in each of the individual documents of the first listing. A second listing of documents is accessed that include a second token, a third mask that comprises a probabilistic representation of a set of integers corresponding to one or more locations of the second token in each of the individual documents of the second listing, and a fourth mask that comprises a probabilistic representation of a set of integers that indicate a positional relationship between the second token and one or more tokens in each of the individual documents of the second listing. The first mask is rotated by the positional relationship between the first token and the one or more other tokens. A determination is made if the rotated first mask is likely to have at least one integer that is in common with the integers of the third mask. A determination is made if the second mask is likely to include an integer that represents the second token.

In an embodiment, those documents of the first listing of documents that have a rotated first mask that is likely to have at least one integer that is in common with the integers of the third mask and a second mask that is likely to include an integer that represents the second token are selected. In the embodiment, it is probable that the second token is immediately adjacent to the first token when it is determined that the rotated first mask is likely to have at least one integer in common with the third mask and it is determined that the second mask is likely to include an integer that represents the second token. In the embodiment, the second token is not immediately adjacent to the first token when it is determined that the rotated first mask does not have any integers in common with the third mask or it is determined that the second mask does not include an integer that represents the second token.

Accordingly, the embodiments described herein provide several advantages over the existing computing technologies. For example, when searching for trigrams (or other n-grams), an existing positional index requires roughly 10 times the size of an existing search engine that uses whole words. The embodiments disclosed herein of the mask-augmented inverted index reduces size by a factor of 10× to offset the increase. In addition, in an existing positional index using trigrams for source code, the index is around 3.6× the size of the corpus. The embodiments disclosed herein of the mask-augmented inverted index is only 35% of the corpus. Thus, the embodiments disclosed herein of the mask-augmented inverted index are 50-90% smaller than the existing positional index. This leads to a large savings in storage costs. In addition, since there is less data to load into a block cache and less data to parse during a search, there is large reduction in the use of computational and network resources.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The embodiments disclosed herein are related to a computing system for generating a mask-augmented inverted index. The mask-augmented inverted index is structured to allow phrase query searching while minimizing the amount of computing system processing and memory resources needed to generate the mask-augmented inverted index. In one embodiment, a first token is mapped to a first listing of documents that include the first token. A first mask is included that comprises a probabilistic representation of a set of integers corresponding to one or more locations of the first token in each of the individual documents of the first listing. A second mask is included that comprises a probabilistic representation of a set of integers that indicate a positional relationship between the first token and one or more other tokens in each of the individual documents of the first listing.

Because the principles described herein is performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

Figure 1:
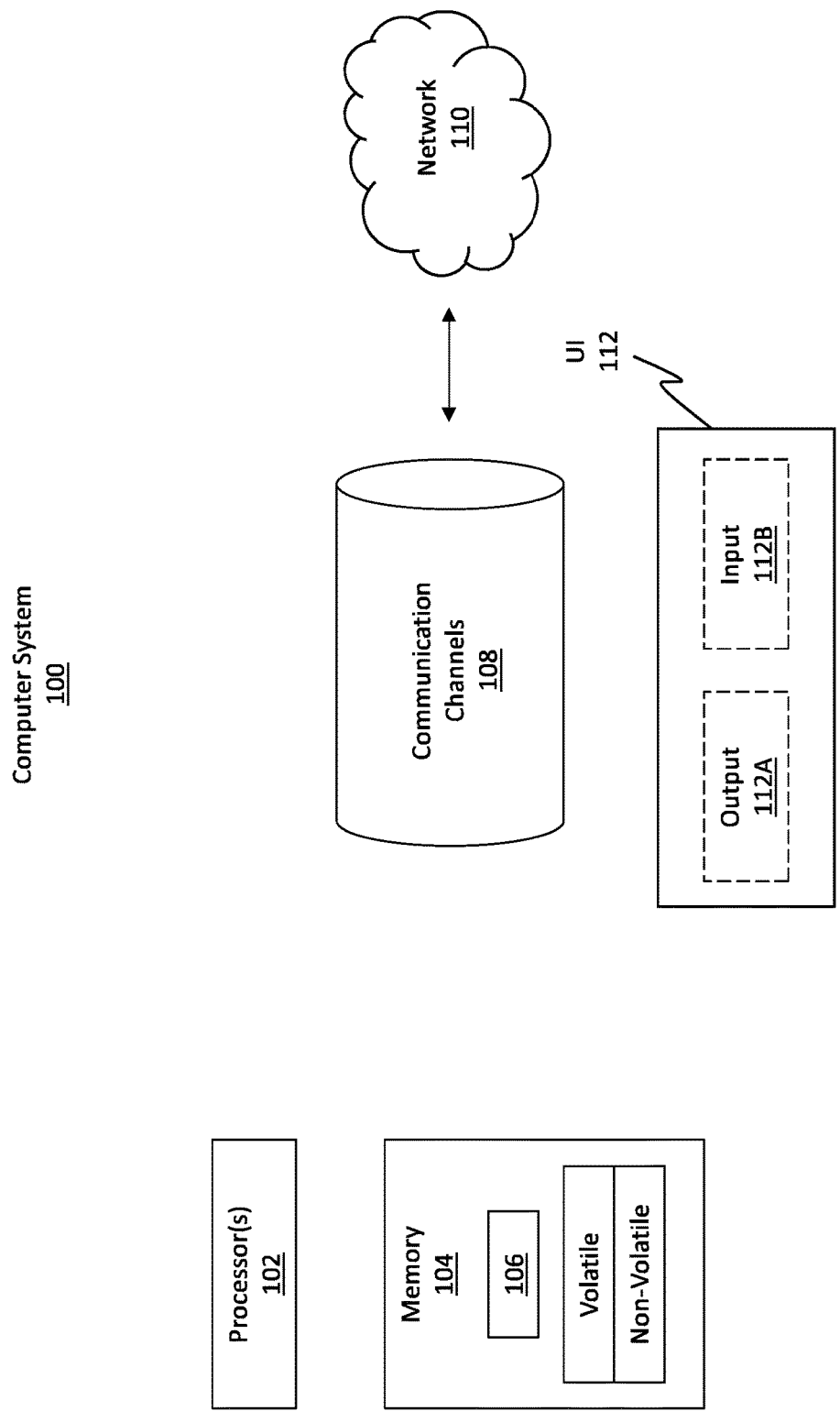
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2A:
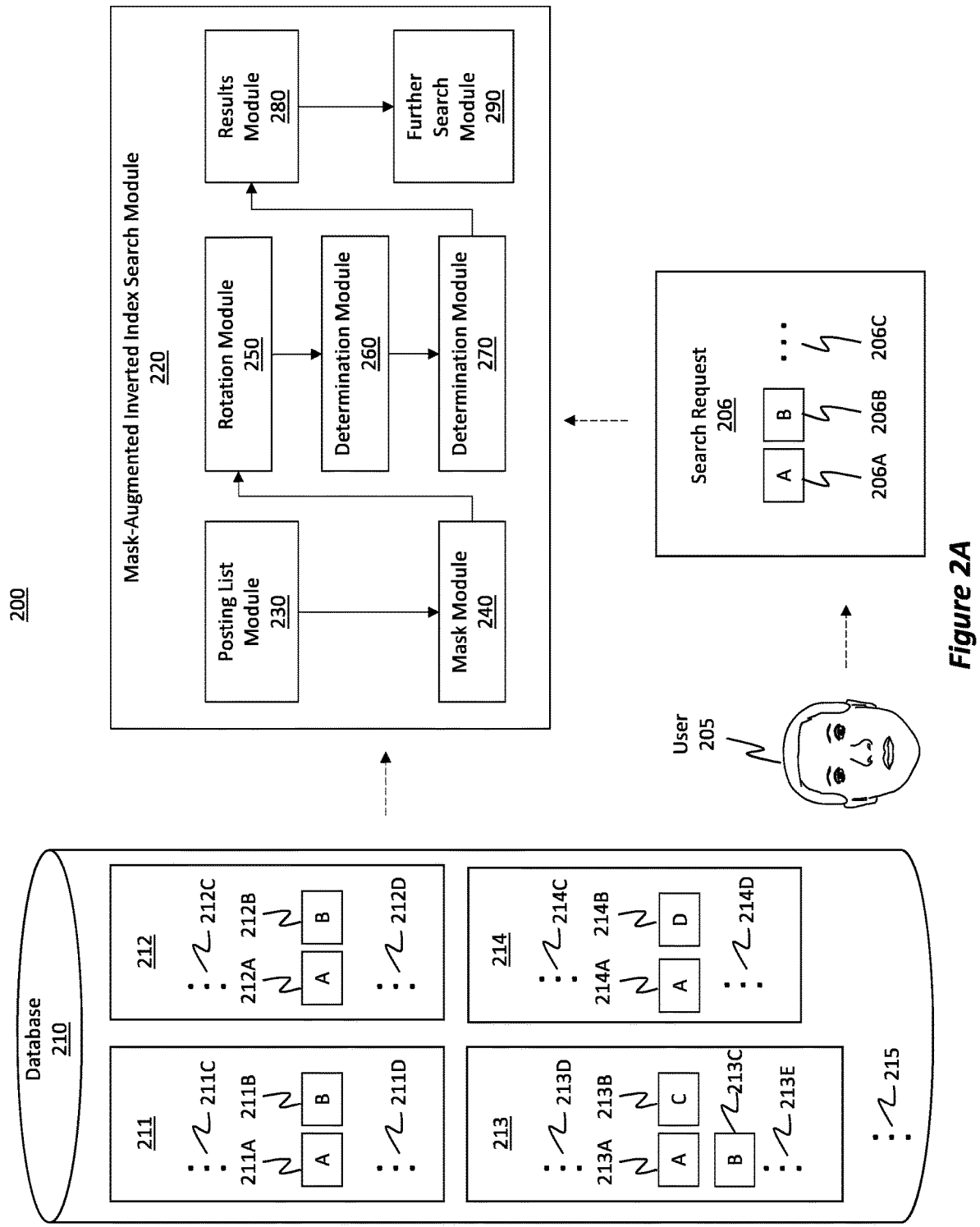
FIG. 2A illustrates an embodiment of a computing system that implements a mask-augmented inverted index search module.

FIG. 2A illustrates an embodiment of an environment of a computing system 200 where the embodiments disclosed herein may be practiced. As illustrated in FIG. 2A, the environment 200 includes a database or repository 210. The database 210 may be a local storage database or it may be distributed database that is connected by a network such as the Internet. The database 210 stores or otherwise has access to various documents such as document 211, document 212, document 213, document 214 and any number of additional documents as illustrated by the ellipses 215. The documents 211-215 may be, but are not limited to, a web page, a source code file, a log file, a line within the source code file or log file, a blog post, a book, an email, or various Office documents. Accordingly, the embodiments disclosed herein are not limited to the particular type of document 211-215.

The documents 211-215 each include multiple tokens that constitute the contents of the document. In some embodiments, a token is a whole word. In other embodiments, a token may be a sequence of characters. The sequence of characters may include one of bigram, a trigram, a 4-gram, an n-gram, a sequence of ASCII characters, a sequence of Unicode characters, or a UTF-8 sequence. For example, trigrams of the word "main" would consist of a trigram "mai" and a trigram "ain".

In the embodiment of FIG. 2A, the document 211 includes a token A denoted at 211A and a token B denoted at 211B. The ellipses 211C illustrate that the document 211 includes additional tokens that occur before the token A denoted at 211A and the token B denoted at 211B. The ellipses 211D illustrate that the document 211 includes additional tokens that occur after the token A denoted at 211A and the token B denoted at 211B. It will be appreciated that the additional tokens 211C and 211D may include additional occurrences of the tokens A and B.

The document 212 includes the token A denoted at 212A and the token B denoted at 212B. The ellipses 212C illustrate that the document 212 includes additional tokens that occur before the token A denoted at 212A and the token B denoted at 212B. The ellipses 212D illustrate that the document 212 includes additional tokens that occur after the token A denoted at 212A and the token B denoted at 212B. It will be appreciated that the additional tokens 212C and 212D may include additional occurrences of the tokens A and B.

The document 213 also includes the token A denoted at 213A and the token B denoted at 212C. The document 213 further includes a token C denoted at 213B. The ellipses 213D illustrate that the document 213 includes additional tokens that occur before the token A denoted at 213A, the token B denoted at 213C, the token C denoted at 213B. The ellipses 213E illustrate that the document 213 includes additional tokens that occur after the token A denoted at 213A, the token B denoted at 213C, the token C denoted at 213B. It will be appreciated that the additional tokens 213D and 213E may include additional occurrences of the tokens A, B and C.

The document 214 includes the token A denoted at 214A and the token D denoted at 214B. The ellipses 214C illustrate that the document 214 includes additional tokens that occur before the token A denoted at 214A and the token D denoted at 214B. The ellipses 214D illustrate that the document 214 includes additional tokens that occur after the token A denoted at 214A and the token D denoted at 214B. It will be appreciated that the additional tokens 214C and 214D may include additional occurrences of the tokens A and D.

FIG. 2A illustrates a user 205 who may be a human user or a non-human user such as another computing system or machine learning classifier. In the embodiment, the user 205 may desire to perform a search of the documents 211-215 to find one or more desired tokens. Accordingly, the user 205 generates a search request 206 for the desired tokens. As illustrated, the search request 206 includes the token A as denoted at 206A and the token B as denoted at 206B. The ellipses 206C represent that the search request 206 may include any number of additional tokens such as the token C or the token D. A search request 206 that includes two or more tokens that must appear in a specific position relative to reach other, such as consecutively, is referred to a phrase query search. For example, in one embodiment the search request 206 that is a phrase query search could include the whole word "blue" as the token A and the whole word "sky" as the token B. Accordingly, as will be explained in more detail to follow the documents 211-215 would be searched to find those documents that includes "blue sky". In other embodiments, the search request 206 that is a phrase query search could include the trigrams of the word "main", with the trigram "mai" as the token A and a trigram "ain" as the token B. It will be appreciated that the phrase query search can include a sequence of whole words or any sequence of characters such as n-grams (i.e., bigrams, trigrams, etc.) or the like as circumstances warrant.

The environment of the computing system 200 also includes a mask-augmented inverted index search module 220. As will be explained in more detail to follow, the mask-augmented inverted index search module 220 receives the search request 206 from the user 205. The mask-augmented inverted index search module 220 the generates a mask-augmented inverted index that lists various documents that might include the tokens (e.g. tokens A and B) that are included in the search request 206. The mask-augmented inverted index is then used to search for the tokens in the index as will be explained in more detail to follow. The mask-augmented inverted index search module 220 includes posting list module 230, a mask module 240, a rotation module 250, a first determination module 260, a second determination module 270, and a results module 280. In some embodiments, the mask-augmented inverted index search module 220 also includes a further search module 290. The various modules of the mask-augmented inverted index search module 220 will be described in more detail to follow. FIG. 2A shows an operational flow path between the various modules of the mask-augmented inverted index search module 220. It will be appreciated that the flow path is for illustration only for some embodiments and that other embodiments may exclude the operation of one or more of the modules. Thus, the operational flow path illustrated in FIG. 2A (or any of other figures) is not limiting on the embodiments disclosed herein.

Figure 2B:
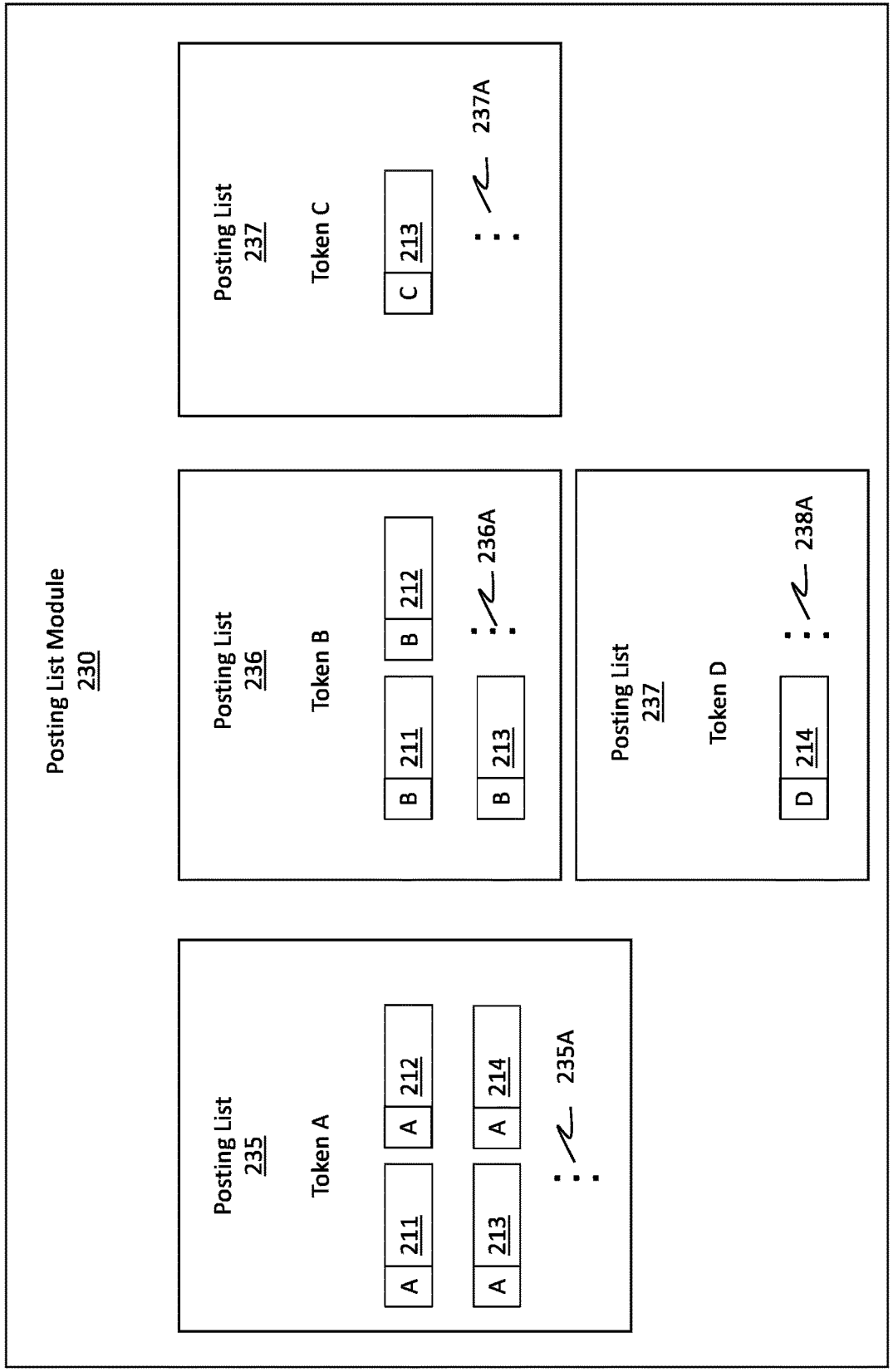
FIG. 2B illustrates an embodiment of a posting list module of the mask-augmented inverted index search module.

FIG. 2B illustrates an embodiment of the posting list module 230. In operation, the posting list module 230 receives the search request 206 and then generates posting lists by mapping each token (e.g. tokens A and B) in the search request 206 to a list of the documents 211-215 that include the token. Each pairing of a document with a token may be referred to a "posting" and each list of the various postings may be referred to as a "posting list."

As illustrated in FIG. 2B, the posting list module 230 generates a first posting list 235 for the token A. As illustrated in FIG. 2A, the documents 211, 212, 213 and 214 include the token A. Accordingly, the first posting list 235 lists documents 211, 212, 213 and 214 that include the token A. The ellipses 235A illustrate that there may be any number of the additional documents 215 that include the token A that may also be listed in the first posting list 235.

The posting list module 230 also generates a second posting list 236 for the token B. As illustrated in FIG. 2A, the documents 211, 212, and 213 include the token B. Accordingly, the second posting list 236 lists documents 211, 212, and 213 that include the token B. The ellipses 236A illustrate that there may be any number of the additional documents 215 that include the token B that may also be listed in the second posting list 236.

In some embodiments, the search request 206 may include additional tokens 206C as part of the phrase query search. The additional tokens may be the tokens C and/or D. Accordingly, in such embodiments the posting list module 230 also generates a third posting list 237 for the token C. As illustrated in FIG. 2A, the document 213 includes the token C. Accordingly, the third posting list 237 lists document 213 that includes the token C. The ellipses 237A illustrate that there may be any number of the additional documents 215 that include the token C that may also be listed in the third posting list 237.

The posting list module 230 also generates a fourth posting list 238 for the token D. As illustrated in FIG. 2A, the document 214 includes the token D. Accordingly, the fourth posting list 238 lists document 214 that includes the token D. The ellipses 238A illustrate that there may be any number of the additional documents 215 that include the token D that may also be listed in the fourth posting list 238.

Figure 2C:
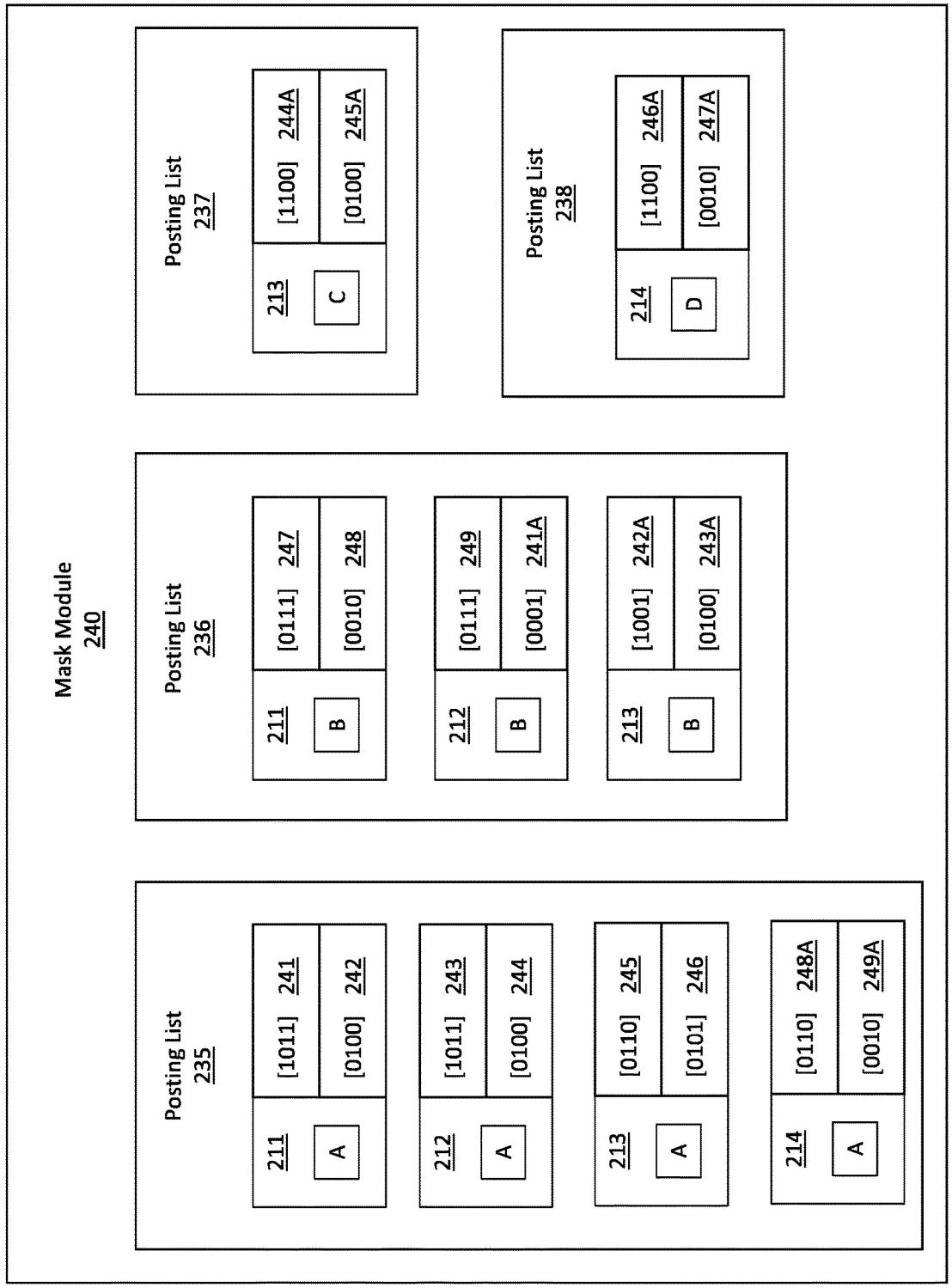
FIG. 2C illustrates an embodiment of a mask module of the mask-augmented inverted index search module.

FIG. 2C illustrates an embodiment of the mask module 240. In operation, the mask module 240 includes various masks for each of the postings (i.e., token and document pair) in the posting lists 235-238. Each of the masks is a data structure that summarizes the contexts within the documents 211-215 where the tokens appear. In some embodiments, the masks may be Bloom filters or at least operate equivalently to a Bloom filter. In some embodiments, the Bloom filters are implemented with four bits.

As illustrated in FIG. 2C, the posting for token A and document 211 includes a mask 241. The mask 241 comprises a probabilistic representation or summary of a set of integers that correspond to the one or more locations of the token A in the document 211. In some embodiments, the location may be a file offset location. In other embodiments, the location may be a line number of the document that includes the token A. Accordingly, the embodiments disclosed herein are not limited to any particular location type. The mask 241 comprises a probabilistic representation or summary of the integers because the integers included in the mask are only likely to correspond to the one or more locations of the token A in the document 211, but are not guaranteed to correspond to the one or more locations. Said another way, when an integer is included in the mask 241, it is more likely than not that the integer corresponds to the location of the token A in the document as will be explained in more detail to follow. In some embodiments the probability is 90% or higher that the integer corresponds to the location of the token A. However, as will also be explained in more detail to follow, there is a possibility that an integer in the mask 241 does not correspond to the location of the token A. It will be appreciated that the discussion of mask 241 may also apply to the other masks discussed herein.

In the illustrated embodiment, the mask 241 is implemented or is equivalent to a four-bit Bloom filter, although the mask 241 is not limited to four-bit Bloom filters. In operation, each bit of the mask 241 represents one or more locations of the token A in the document 211. For example, suppose that the location is a file offset location. In one embodiment, a mod 4 operation may be used to map the file offset location to a bit position in the four-bit array. Thus, in the illustrated embodiment the token A is located at one or more of the file offset locations having a mod 4 remainder of 0, which would be file offset locations 4, 8, 12, 16, and so on since the 0 bit has a 1. Likewise, the token A is located at one or more of the file offset locations having a mod 4 remainder of 1, which would be file offset locations 5, 9, 13, 17, and so on since the 1 bit has a 1. Further, the token A is located at one or more of the file offset locations having a mod 4 remainder of 3, which would be file offset locations 7, 11, 15, 19, and so on since the 3 bit has a 1. However, the token A is not located at any file offset locations have a mod 4 remainder of 2 since the 2 bit has a 0. It will be noted that when a 1 appears in a bit location, this means that it is likely that the token A is located in that location as discussed previously. However, when a 0 appears in a bit location, this means that it is guaranteed to not be located in that location. This meaning of the 0s and 1s in each bit location apply to all the masks disclosed herein.

As also illustrated in FIG. 2C, the posting for token A and document 211 includes a mask 242. The mask 242 comprises a probabilistic representation or summary of a set of integers that indicate a positional relationship between the token A and other tokens in the document 211. The positional relationship may be a summary of those tokens that are immediately adjacent to the token A, that immediately follow the token A, or that are within a specified distance from the token A such as two tokens in front or behind. Accordingly, the embodiments disclosed herein are not limited by the positional relationship between the token A and the other tokens. It will be noted, however, that it may be helpful during a phrase query search to have the positional relationship be the token immediately adjacent to or following the token A as this helps ensure that the search returns the tokens included in the phrase query search. As with the mask 241, the mask 242 comprises a probabilistic representation or summary of the integers because the integers included in the mask are only likely to indicate a positional relationship between the token A and other tokens in the document 211, but are not guaranteed to indicate the relationship as there may be a false positives included in the probabilistic representation or summary. That is, in some embodiments the probability is 90% or higher that the integer indicates a positional relationship between the token A and other tokens in the document 211. It will be appreciated that the discussion of mask 242 may also apply to the other masks discussed herein.

In the illustrated embodiment, the mask 242 is implemented or is equivalent to a four-bit Bloom filter, although the mask 242 is not limited to four-bit Bloom filters. In operation, each bit of the mask 242 represents a token that is likely to satisfy the positional relationship with the token A. For example, for ease of explanation suppose that the positional relationship is those tokens that immediately follow token A. As illustrated in FIG. 2A, the token B immediately follows the token A in document 211. Accordingly, a bit representing the token B will be set with a 1, which is the 3 bit location in the illustrated embodiment. The 3 bit may be selected by running the token B through a hash function or by using an ASCII representation for the token B. Thus, if the token A were "blue" and the token B were "sky" in a phrase query search for "blue sky", the 1 in the three bit location would represent "sky". Likewise, if the token A were the trigram "mai", and the token B were the trigram "ain" in a phrase query search for "main", then the 1 in the three bit location would represent either "ain" or "n" as it immediately follows "mai".

It will be appreciated that only one bit is shown being set in the mask 242 for ease of explanation. In fact, it is possible that more bits may be set if other tokens follow the token A in the document 211. For example, if the document 211 included "blue shirt" and/or "blue house", then a bit representation for "shirt" and/or "house" may also be set in the bit array of the mask 242 for a "blue sky" phrase query search since "shirt" and "house" also follow "blue". Likewise, if the document 211 included "maid" and/or "mail", then a bit representation for "aid", "d", "ail" and/or "l" may also be set in the bit array of the mask 242 for the trigram phrase query search using "mai" as the token A since "ail" and "aid" may also follow "mai'.

The posting for token A and document 212 includes a mask 243 and a mask 244 that comprise a probabilistic representation or summary of a set of integers that correspond to the one or more locations of the token A in the document 212 and a set of integers that indicate a positional relationship between the token A and other tokens in the document 212 respectively. Thus, the bits of the bit array in the mask 243 are likely to represent a location of the token A in the document 212 as explained in relation to mask 241. The locations of the token A in the document 212 have the same file offset value as in document 211 and so mask 243 has the same bit array as mask 241. However, this need not be the case as the token A may be located in different file offset locations in the documents 211 and 212. As illustrated in FIG. 2A, the token B immediately follows the token A in the document 212. Accordingly, the mask 244 has the 3 bit set to a 1 as in the mask 211, which indicates that it is likely the token B immediately follows the token A.

The posting for token A and document 213 includes a mask 245 and a mask 246 that comprise a probabilistic representation or summary of a set of integers that correspond to the one or more locations of the token A in the document 213 and a set of integers that indicate a positional relationship between the token A and other tokens in the document 213 respectively. Thus, the bits of the bit array in the mask 245 are likely to represent a location of the token A in the document 213 as explained in relation to mask 241. As illustrated, different bits are set to 1 in the mask 245 than in the masks 241 and 243 as the token A is at different file offset locations in the document 213 than in the other documents. As illustrated in FIG. 2A, the token C immediately follows the token A in the document 213. Accordingly, the mask 246 has the 1 bit set to a 1 as this likely represents the token C in the illustrated embodiment. Mask 246 also has the 3 bit set to 1 even though the token B does not follow the token A in the document 213. This means that an unshown token, other than the token B, that is also represented by the 3 bit immediately follows token A in an unshown part of document 213.

The posting for token A and document 214 includes a mask 248A and a mask 249A that comprise a probabilistic representation or summary of a set of integers that correspond to the one or more locations of the token A in the document 214 and a set of integers that indicate a positional relationship between the token A and other tokens in the document 214 respectively. Thus, the bits of the bit array in the mask 248A likely represent a location of the token A in the document 214 as explained in relation to mask 241. As illustrated in FIG. 2A, the token D immediately follows the token A in the document 214. Accordingly, the mask 249A has the 2 bit set to a 1 as this likely represents the token D in the illustrated embodiment.

The posting for token B and document 211, the posting for token B and document 212, the posting for token B and the document 213 in the second posting list 236 include the masks 247, 248, 249, 241A, 242A, and 243A respectively as illustrated in FIG. 2C. All of these masks comprise a probabilistic representation or summary of a set of integers as previously described in relation to the previously discussed masks. Thus, the bits of the bit arrays in the masks 247, 249, and 242A likely represent a location of the token B in the documents 211, 212, 213 respectively as explained in relation to mask 241. Likewise, the masks 248, 241A, and 243A represent non-illustrated tokens in the documents 211, 212, and 213 respectively that likely follow the token B.

The posting for the token C and the document 213 includes a mask 244A and mask 245A that comprise a probabilistic representation or summary of a set of integers that correspond to the one or more locations of the token C in the document 213 and a set of integers that indicate a positional relationship between the token C and other tokens in the document 213 respectively. Thus, the bits of the bit array in the mask 244A likely represent a location of the token C in the document 213 as explained in relation to mask 241. As illustrated in FIG. 2A, the token B immediately follows the token C in the document 213. Accordingly, the mask 245A has the 3 bit set to a 1 as this represents the token B likely immediately follows the token C in the illustrated embodiment.

The posting for the token D and the document 214 includes a mask 246A and mask 247A that comprise a probabilistic representation or summary of a set of integers that correspond to the one or more locations of the token D in the document 214 and a set of integers that indicate a positional relationship between the token D and other tokens in the document 214 respectively. Thus, the bits of the bit array in the mask 246A likely represent a location of the token D in the document 214 as explained in relation to mask 241. The mask 247A represents a non-illustrated token in the document 214 that likely follows the token D.

Figure 2D:
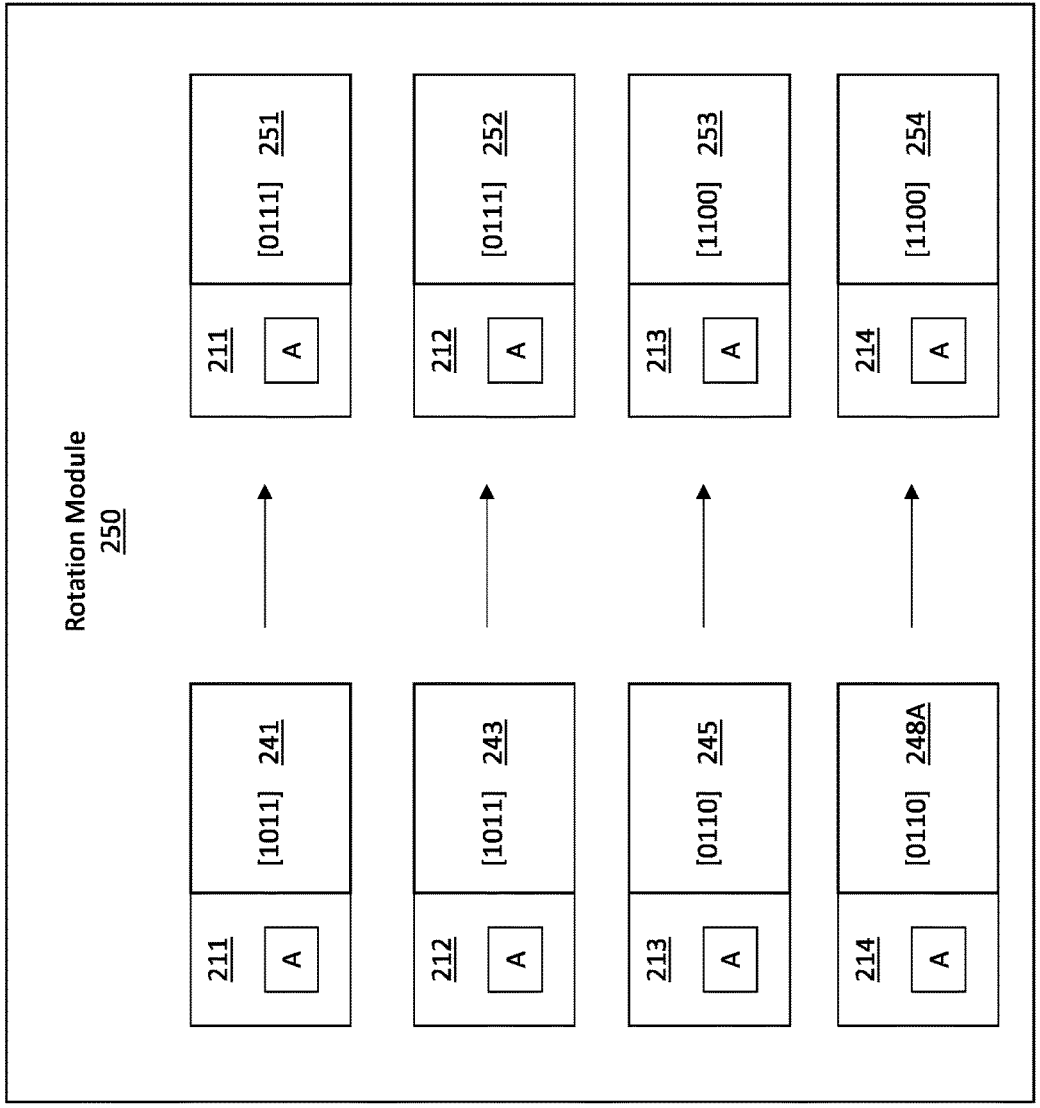
FIG. 2D illustrates an embodiment of a rotation module of the mask-augmented inverted index search module.

FIG. 2D illustrates an embodiment of the rotation module 250. In operation, the rotation module 250 is configured to rotate the masks 241, 243, 245 and 248A by the positional relationship between the token A and token B intended in the search request. For example, in the embodiments were the masks 241, 243, 245 and 248A are four-bit arrays and the positional relationship is that the token B is immediately adjacent to or following the token A, then the rotation module 250 would rotate the bit arrays by one bit to the left. In embodiments where the positional relationship is that the token B is two tokens removed from the token A, then the rotation module 250 would rotate the bit arrays two bits to the left. Accordingly, the embodiments disclosed herein are not limited by any specific rotation of the masks 241, 243, 245 and 248A.

As illustrated in FIG. 2D, where the positional relationship is that the token B is immediately adjacent to or following the token A, the four-bit array of the mask 241 is rotated by the rotation module 250 one bit to the left as shown at 251. The four bit array of the mask 243 is rotated by the rotation module 250 one bit to the left as shown at 252. The four bit array of the mask 245 is rotated by the rotation module 250 one bit to the left as shown at 253. The four bit array of the mask 248A is rotated by the rotation module 250 one bit to the left as shown at 254.

Figure 2E:
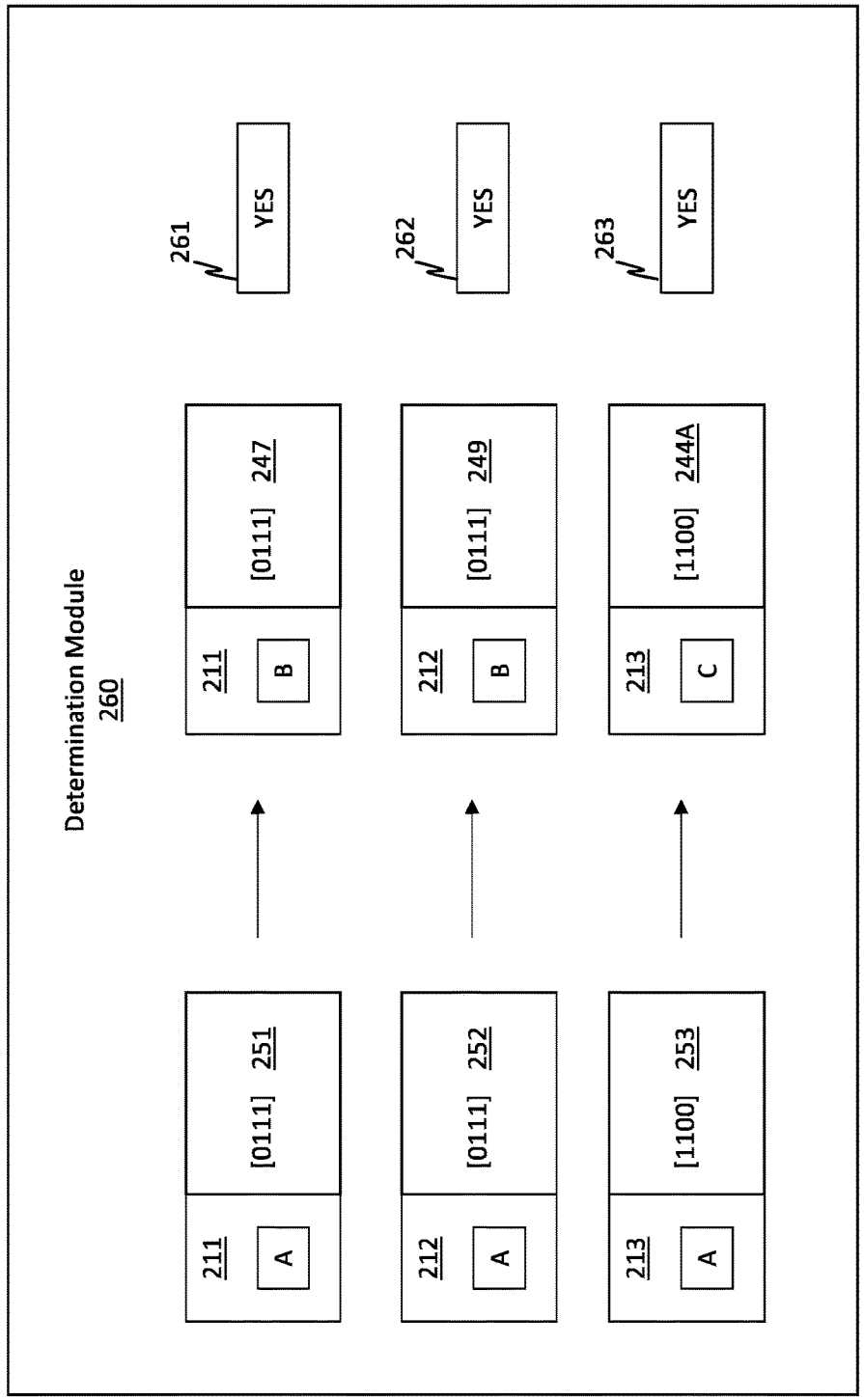
FIGS. 2E and 2F illustrate an embodiment of a first determination module of the mask-augmented inverted index search module.
Figure 2F:
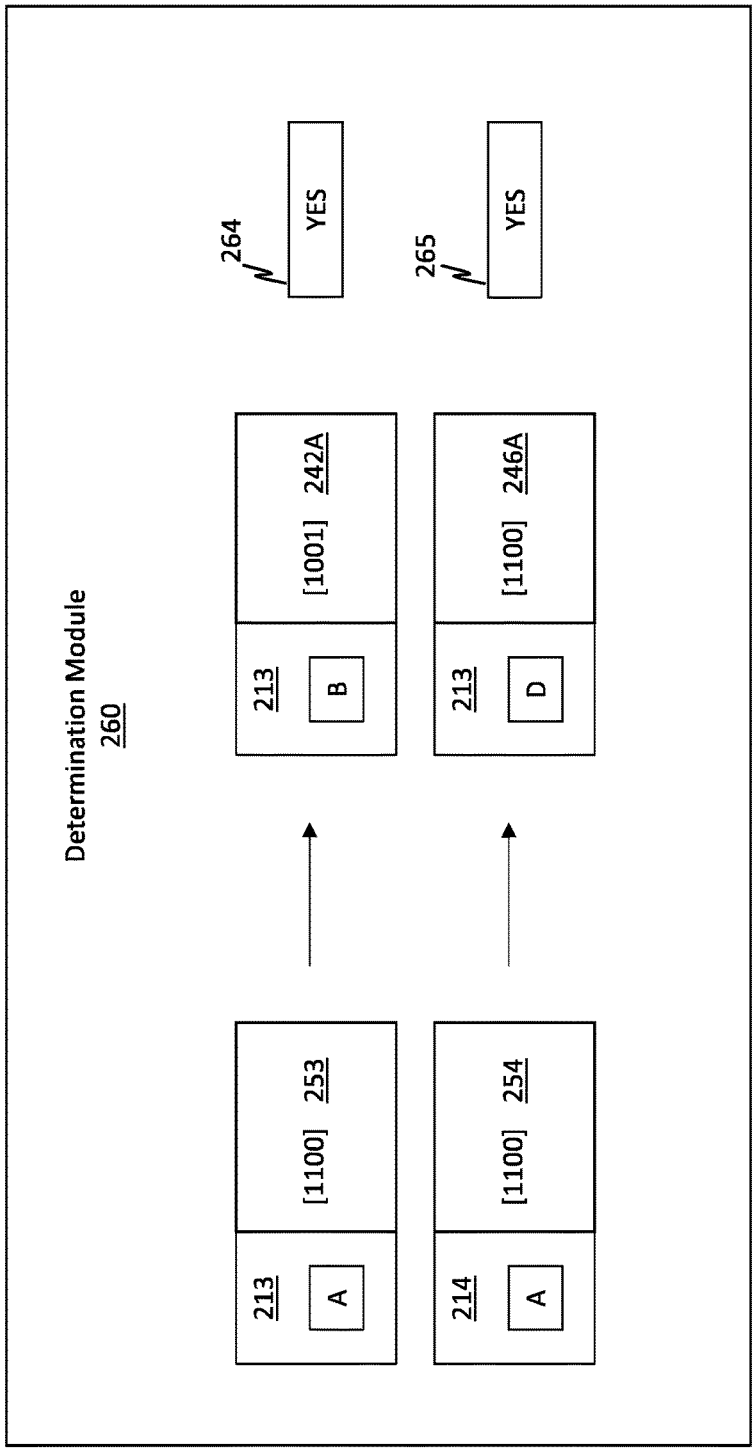

FIGS. 2E and 2F illustrate an embodiment of the first determination module 260. In operation, the first determination module 260 is configured to determine if the masks that were rotated by the rotation module 250 are likely to include at least one integer that is in common with the integers of the masks corresponding to the locations of the tokens that satisfy the positional relationship between the token A and the other tokens of the documents 211-215. For example, in the embodiment where the positional relationship is the tokens immediately adjacent to or following the token A, the masks related to the locations of those tokens would be compared with the rotated masks. This is shown in FIGS. 2E and 2F.

As shown in FIG. 2E, the first determination module 260 compares the rotated mask 251 (i.e., the rotation of mask 241) with the mask 247 of the token B since the token B immediately follows the token A in document 211. As denoted at 261, the first determination module 260 determines that the rotated mask 251 has three bits that are in common with the mask 247.

The first determination module 260 also compares the rotated mask 252 (i.e., the rotation of mask 243) with the mask 249 of the token B since the token B immediately follows the token A in document 212. As denoted at 262, the first determination module 260 determines that the rotated mask 252 has three bits that are in common with the mask 249.

The first determination module 260 further compares the rotated mask 253 (i.e., the rotation of mask 245) with the mask 244A of the token C since the token C immediately follows the token A in document 213. As denoted at 263, the first determination module 260 determines that the rotated mask 253 has one bit that is in common with the mask 244A.

By way of comparison, if the first determination module 260 compares the rotated mask 253 with the mask 242A of the token B, then as denoted at 264 in FIG. 2F the first determination module 260 determines that the rotated mask 253 has one bit in common with the mask 242A. As will be discussed in more detail to follow, this would be an example of a potential "false positive" because even though the token B does not immediately follow the token A in document 213, it still has an file offset location that is in common with the rotated mask 253.

As shown in FIG. 2F, the first determination module 260 compares the rotated mask 254 (i.e., the rotation of mask 248A) with the mask 246A of the token D since the token D immediately follows the token A in document 214. As denoted at 265, the first determination module 260 determines that the rotated mask 254 has two bits that are in common with the mask 246A.

Figure 2G:
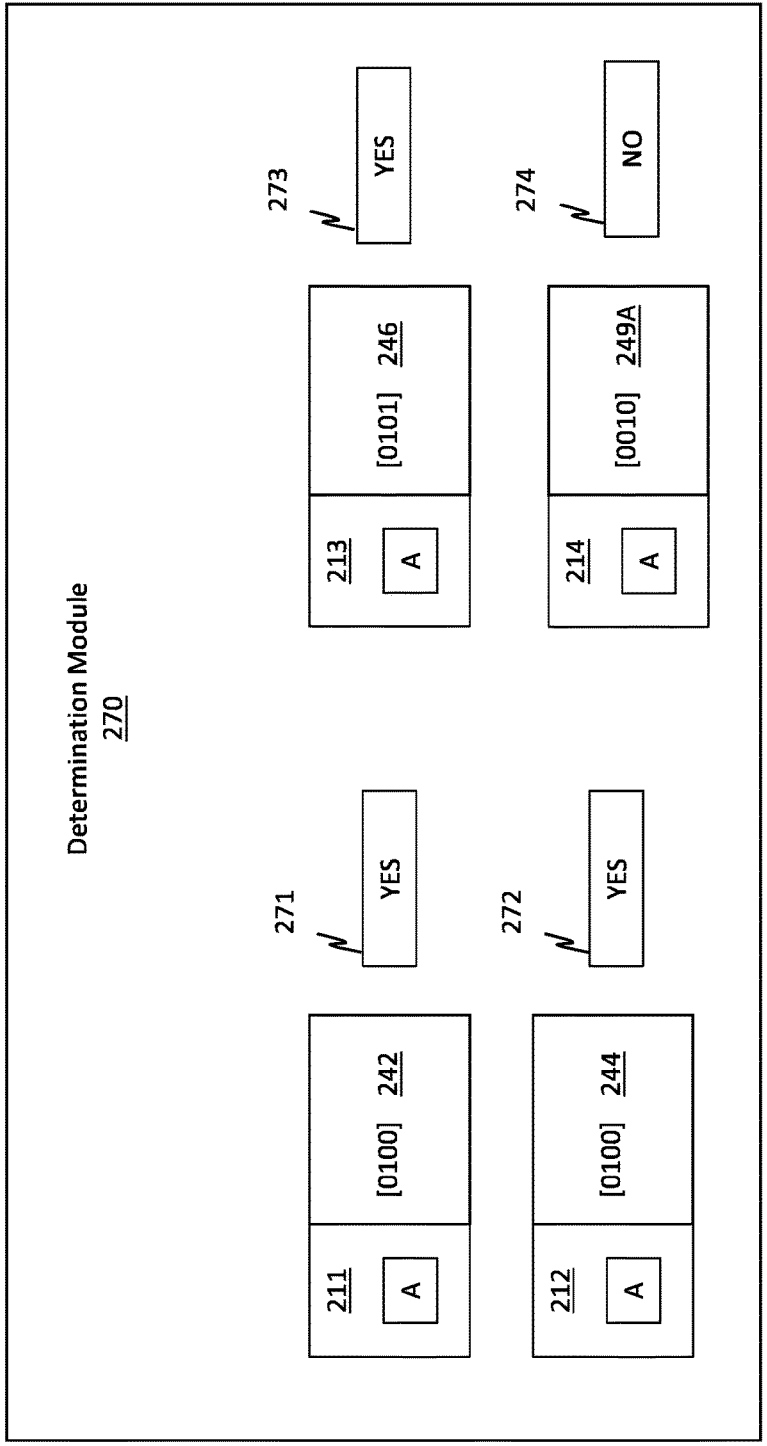
FIG. 2G illustrates an embodiment of a second determination module of the mask-augmented inverted index search module.

FIG. 2G illustrates an embodiment of the second determination module 270. In operation, the second determination module 270 is configured to determine if the second mask of the token A likely includes an integer that represents the token B. As shown in FIG. 2G, the mask 242 has a 1 set in the 3 bit location of the bit array, which as described above represents the token B in the illustrated embodiment. Accordingly, as denoted at 271 the second determination module 270 determines that the mask 242 likely includes an integer that represents the token B. Likewise, the mask 244 has a 1 set in the 3 bit location of the bit array. Accordingly, the second determination module 270 determines that the mask 244 likely includes an integer that represents the token B as denoted at 272.

As discussed previously, the token C immediately follows the token A in the document 213 and this is indicated by the 1 being set in the 1 bit position of the bit array of the mask 246 in the illustrated embodiment, which illustrates that mask 246 likely includes the token C. Accordingly, if only the 1 bit were set in the bit array, the second determination module 270 would determine that the mask 246 did not include an integer representation of the token B since a 0 would be set in the other bit locations. However, as also previously described, the document 213 includes a token A that is followed by an unshown token other than the token B that is represented by a 1 being set in the 3 bit position of the bit array. Accordingly, as denoted at 273, the second determination module 270 determines that the mask 246 likely includes an integer represents the token B. As will be discussed in more detail to follow, this would be an example of a potential "false positive" because even though the token B does not immediately follow the token A in document 213, it is represented as such in the mask 246.

As shown in FIG. 2G, the mask 249A has a 1 set in the 2 bit location of the bit array, which as described above illustrates that mask 249A likely includes an integer representation of the token D in the illustrated embodiment. However, the mask 249A does not include a 1 bit in the 3 bit location, but rather includes a 0 bit in this bit location. Accordingly, as denoted at 274 the second determination module 270 determines that the mask 249A does not include an integer representation of the token B since there is a 0 bit in the 3 bit location.

Figure 2H:
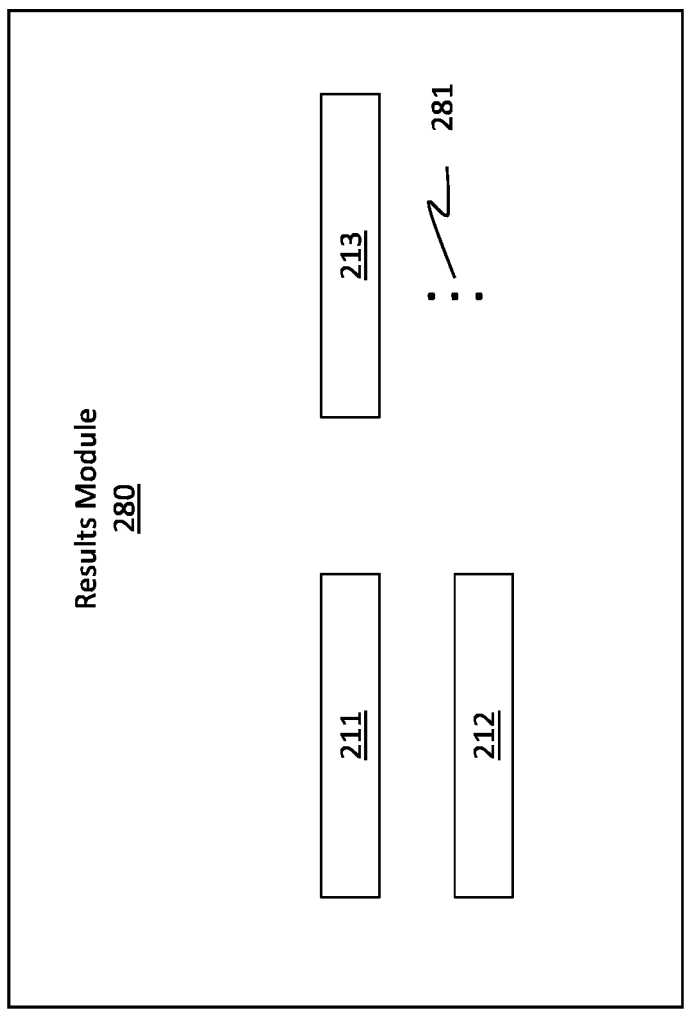
FIG. 2H illustrates an embodiment of a results module of the mask-augmented inverted index search module.

FIG. 2H illustrates an embodiment of the results module 280. In operation, the results module 280 is configured to select those documents of the first posting list 235 that have rotated masks that are likely to have at least one integer that is in common with the integers of the location masks of the second posting list 236, the third posting list 237 and/or the fourth posting list 238 and that have masks that are likely to include an integer that represents the second token. That is, the selected documents include those documents probable or likely to include the tokens A and B in the desired positional relationship such as having the token B immediately follow the token A.

As described previously, the first determination module 260 determines that the rotated masks 251, 252, 253, and 254 include at least one bit in their respective bit arrays that is in common with at least one bit in the bit arrays of the masks 247, 249, 242A, 244A and 246A. In addition, the second determination module 270 determines that the masks 242, 244, and 246 include in their respective bit arrays a bit that represents the token B. Accordingly, based on both of these determinations, the results module 280 determines that is probable or likely that the documents 211, 212, and 213 include the token A immediately followed by the token B as is shown in FIG. 2H. The ellipses 281 illustrate that the results module 280 may determine that any number of additional documents are likely to include the token A immediately followed by the token B.

As also discussed above, the second determination module 270 determines that the mask 249A does not include in its bit array a bit that represents the token B. Accordingly, the document 214 is not selected by the results module 280 as being a document that is likely to include the token A followed by the token B. This is true even though the first determination module 260 determined that the rotated mask 254 included at least one bit in common with the mask 246A of the token D.

Accordingly, this illustrates that a document is only selected by the results module 280 if the first determination module 260 and the second determination module 270 both make an affirmative determination. In other words, a second token is not immediately adjacent to a first token when it is determined that the rotated mask of the first token does not have at least one integer in common with the location mask of the second token or it is determined that the second mask of the first token does not include an integer that represents the second token. Thus, even though the first determination module 260 made an affirmative determination that the rotated mask 254 had at least one bit in common with the mask 246A of the token D, since the second determination module 270 did not determine that the mask 249A included a representation of the token B the document 214 is not selected.

On the other hand, if the first determination module 260 and the second determination module 270 both make an affirmative determination for a given document, then it is probable or likely that such document does include the token A immediately followed by the token B. However, in some instances it is possible that the first determination module 260 and the second determination module 270 both make an affirmative determination for a given document, but the document does not actually include the token A immediately followed by the token B.

For example, as previously discussed, the first determination module 260 may determine that rotated mask 253 of the token A has at least one bit in common with the mask 242A of the token B because, even though the token B does not immediately follow the token A in document 213, it still has a file offset location that is in common with the rotated mask 253. In addition, as previously discussed, the document 213 may include a token A that is followed by an unshown token other than the token B that is represented by a 1 being set in the 3 bit position of the bit array. Accordingly, the second determination module 270 may determine that the mask 246 includes a representation of the token B because, even though the token B does not immediately follow the token A in document 213, it is represented as such in the mask 246. Thus, in the illustrated embodiment, the selection module 280 would select the document 213 even though the document 213 does not in fact include the token A immediately followed by the token B.

Figure 2I:
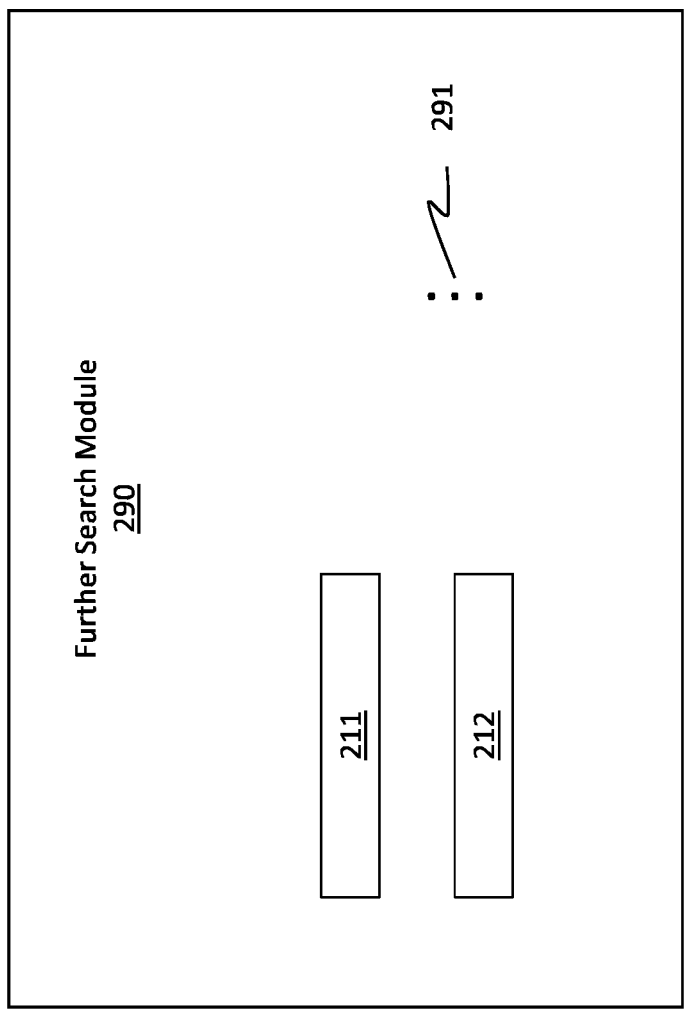
FIG. 2I illustrates an embodiment of a further search module of the mask-augmented inverted index search module.

Accordingly, in some embodiments the mask-augmented inverted index search module 220 also includes a further search module 290. In operation, the further search module 290 is configured to search through the documents selected by the results module 280 and determine which of them, if any, includes the tokens from the search request 206 in the requested positional relationship. Accordingly, as illustrated in FIG. 2I, the further search module 290 determines that the document 213 does not include the token A immediately followed by the token B and removes the document 213 from the list of documents that do include the token A immediately followed by the token B. Thus, only the documents 211, 212, and any number of additional documents as illustrated by the ellipses 291 are returned to the user 205 in response to the search request 206.

It will be appreciated that the embodiments disclosed herein use a small number of documents for ease of explanation. Accordingly, as shown in FIG. 2H, the embodiments disclosed herein eliminate the document 214 as a document that includes the token A immediately followed by the token B since this does not occur in the document 214. However, the false positive document 213 is still selected. In practice, for a database 210 including millions or billions of documents, the embodiments disclosed herein eliminate a large number of documents just by determining that the documents do not include the tokens of the search request 206 in the intended positional relationship. In addition, the embodiments disclosed herein are able to eliminate 90-99% of the false positive documents such as document 213. The small number of false positive documents can then be removed by the further search module 290. This represents an advancement over existing systems that either require a large amount of time and computing and network resources for a component such as the further search module 290 to scan each document that might include the search tokens in the intended positional relationship or that require a very large amount of memory resources to store an index with full positional information for each token in each document.

Figure 3:
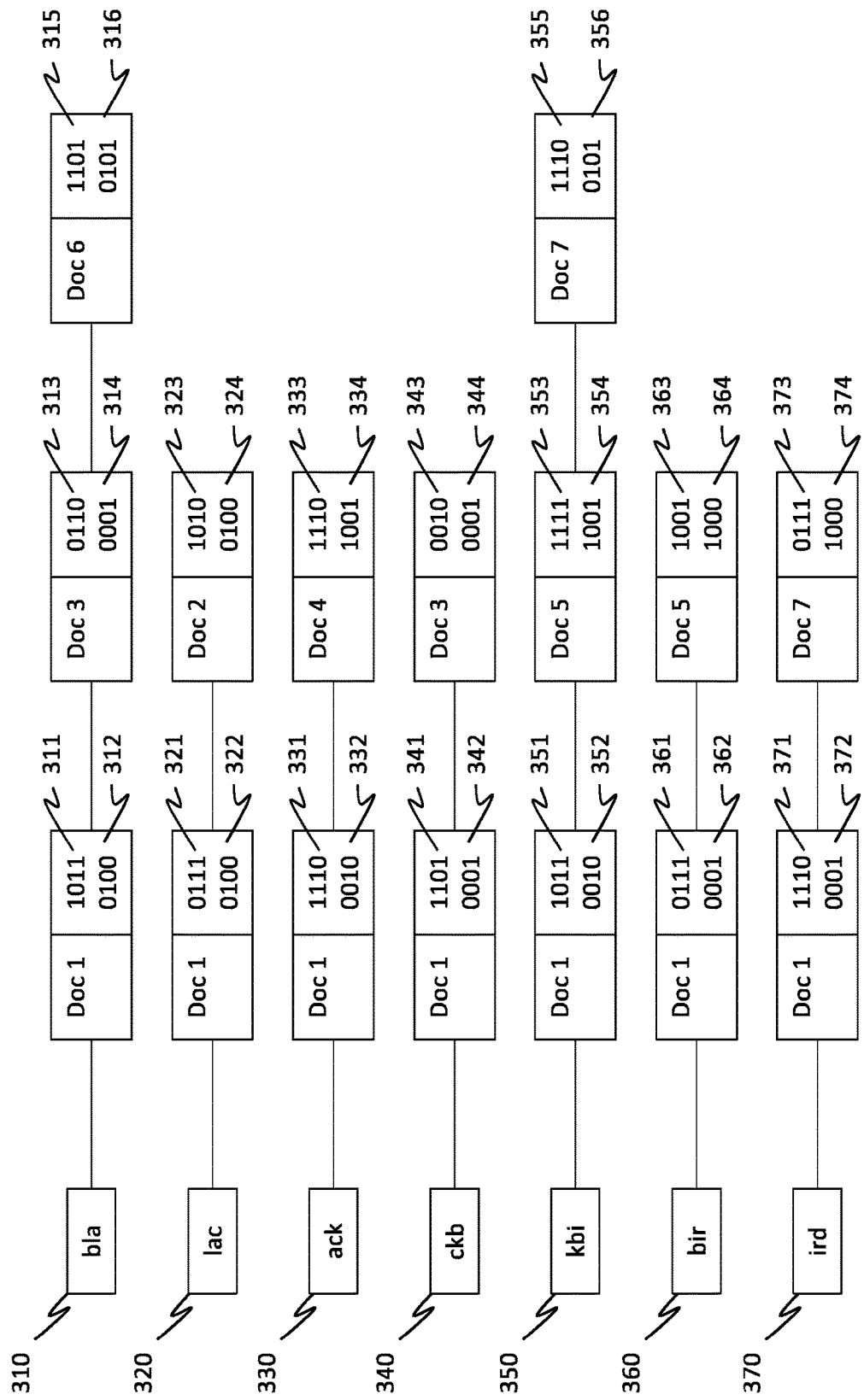
FIG. 3 illustrates an embodiment of using the mask-augmented inverted index search module to search for a token.

FIG. 3 illustrates an embodiment of using the mask-augmented inverted index search module 220 to search for the term "blackbird" in various documents. As illustrated in FIG. 3, the term blackbird has been broken into trigrams. For example, the trigrams "bla" 310, "lac" 320, "ack" 330, "ckb" 340, "kbi" 350, "bir" 360, and "ird" 370. It will be noted that the one or more of the trigrams 310-370 may also appear in the terms "bland laces", "sackbuts", "hawkbills", "birthmarks", and "airdocks".

As illustrated in FIG. 3, the mask-augmented inverted index search module 220 includes posting lists for the documents from the database 210 that include at least one of the trigrams 310-370. For example, for the trigram "bla"310, a posting list includes Doc 1, Doc 3, and Doc 6. For the trigram "lac" 320, a posting list includes Doc 1 and Doc 2. For the trigram "ack" 330, a posting list includes Doc 1 and Doc 4. For the trigram "ckb" 340, a posting list includes Doc 1 and Doc 3. For the trigram "kbi" 350, a posting list includes Doc 1, Doc 5, and Doc 7. For the trigram "bir" 360, a posting list includes Doc 1 and Doc 5. For the trigram "ird" 370, a posting list includes Doc 1 and Doc 7.

As further illustrated in FIG. 3, the mask-augmented inverted index search module 220 includes a first mask 311 and second mask 312 for the Doc 1 and "bla" 310 posting, a first mask 321, and second mask 322 for the Doc 1 and "lac" 320 posting, a first mask 331, and second mask 332 for the Doc 1 and "ack" 330 posting, a first mask 341, and second mask 342 for the Doc 1 and "ckb" 340 posting, a first mask 351, and second mask 352 for the Doc 1 and "kbi" 350 posting, a first mask 361, and second mask 362 for the Doc 1 and "bir" 360 posting, and a first mask 371, and second mask 372 for the Doc 1 and "ird" 370 posting. Likewise, the mask-augmented inverted index search module 220 includes a first mask 313 and second mask 314 for the Doc 3 and "bla" 310 posting, a first mask 315 and second mask 316 for the Doc 6 and "bla" 310 posting, a first mask 323 and second mask 324 for the Doc 2 and "lac" 320 posting, a first mask 333 and second mask 334 for the Doc 4 and "ack" 330 posting, a first mask 343 and second mask 344 for the Doc 3 and "ckb" 340 posting, a first mask 353 and second mask 354 for the Doc 5 and "kbi" 350 posting, a first mask 355 and second mask 356 for the Doc 7 and "kbi" 350 posting, a first mask 363 and second mask 364 for the Doc 5 and "bir" 360 posting, and a first mask 373 and second mask 374 for the Doc 7 and "ird" 370 posting.

The first and second masks illustrated in FIG. 3 are in accordance with masks 241 and 242 discussed previously. For example, the first masks comprise a probabilistic representation or summary of a set of integers that correspond to the location of the respective trigram in the respective documents. In the embodiment of FIG. 3, the set of integers is summarized by a 4-bit array representing file offset location in the document. The second masks comprise a probabilistic representation or summary of a set of integers corresponding to the one or more tokens following the trigram in the respective document.

Accordingly, it can be seen in FIG. 3 that if the mask 311 is rotated one to the left, it would contain one more of the same bits as the mask 321 and if the mask 321 is rotated one to the left, it would contain one more of the same bits as the mask 331. It can be seen that rotating all the first masks of the postings including Doc 1 results in masks that contain one or more bits in common with the first mask of the following trigram. In addition, each of the second masks of the posting including Doc 1 include a representation of the letter following the trigram in the term "blackbird". For example, the mask 312 includes a representation of "c" and the mask 322 includes a representation of "k", and so on for all the second masks 332, 342, 352, 362, and 372. Accordingly, it can be determined that Doc 1 is likely to include the term "blackbird".

The remaining documents shown in FIG. 3 do not include the term "blackbird". For example, there is no other document besides Doc 1 that includes all the trigrams 310-370. In addition, those documents that do include some of the trigrams do not have first and second masks that both include the required file offset locations when the first mask are rotated one bit to the left and that satisfy the positional relationship. Thus, these documents may include one or more of the terms "bland laces", "sackbuts", "hawkbills", "birthmarks", and "airdocks", but not the term "blackbird".

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
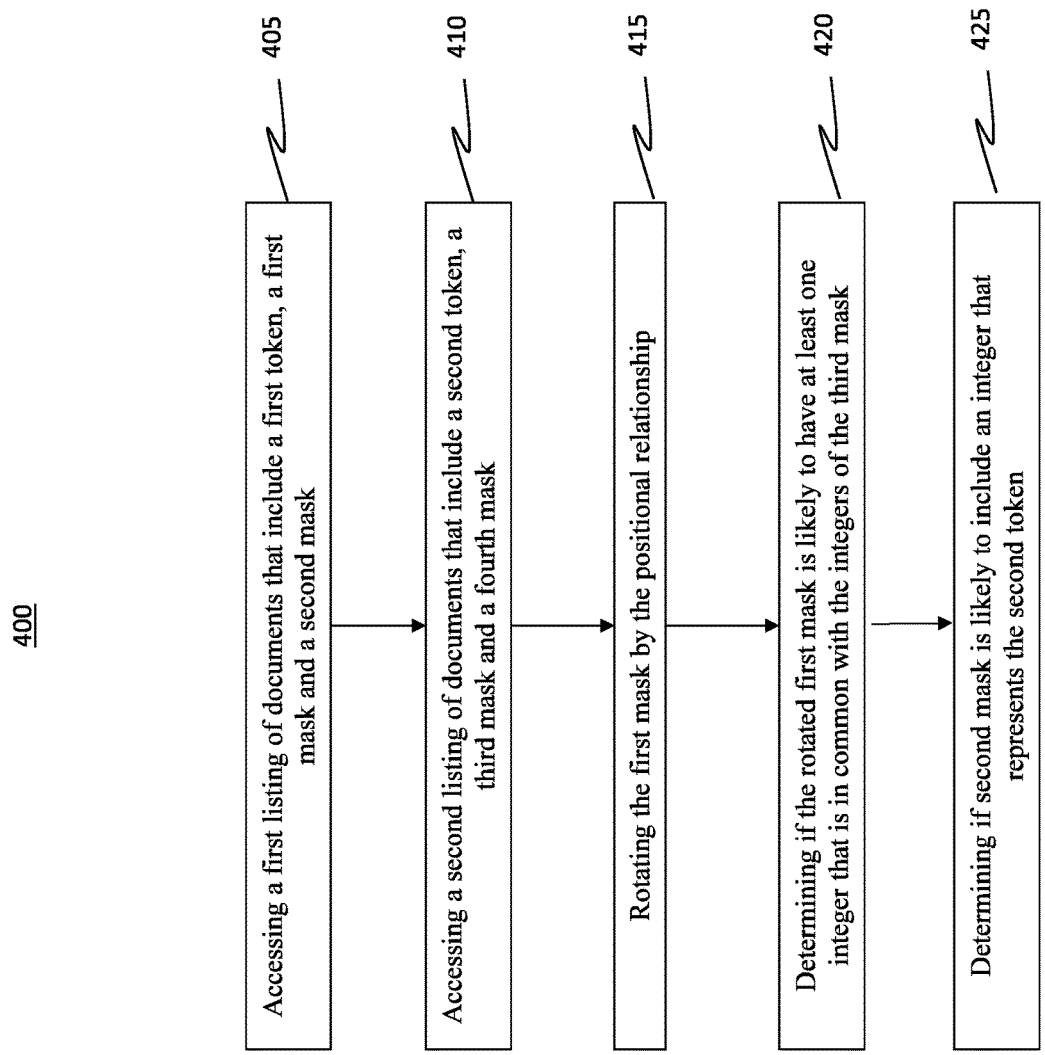
FIG. 4 illustrates a flowchart of an example method for performing a phrase query search using a mask-augmented inverted index that is structured to allow phrase query searching while minimizing the amount of computing system processing and memory resources needed for performing the phrase query search.

FIG. 4 illustrates a flow chart of an example method 400 for performing a phrase query search using a mask-augmented inverted index that is structured to allow phrase query searching while minimizing the amount of computing system processing and memory resources needed for performing the phrase query search. The method 400 will be described with respect to one or more of FIGS. 2-3 discussed previously.

The method 400 includes accessing 405 a first listing of documents that include a first token, a first mask that comprises a probabilistic representation of a set of integers corresponding to one or more locations of the first token in each of the documents of the first listing, and a second mask that comprises a probabilistic representation of a set of integers that indicate a positional relationship between the first token and one or more other tokens in each of the documents of the first listing. For example, as previously discussed, the posting list module 230 of the mask-augmented inverted index search module 220 maps the token A to the first posting list 235. The mask module 240 of the mask-augmented inverted index search module 220 includes the first masks 241, 243, 245, and 248A that comprise the probabilistic representation of the set of integers corresponding to the one or more locations of token A in the documents 211-214. In one embodiment, the set of integers are summarized in a 4-bit array that represents one or more file offset locations where the token A appears in the document.

As previously discussed, the mask module 240 of the mask-augmented inverted index search module 220 also includes the second masks 242, 244, 246, and 249A that comprise the probabilistic representation of a set of integers that indicate a likely positional relationship between the token A and one or more other tokens in the documents 211-214 of the first posting list 235. In one embodiment, the positional relationship is the token that immediately follows the token A in the documents.

The method 400 includes accessing 410 a second listing of documents that include a second token, a third mask that comprises a probabilistic representation of a set of integers corresponding to one or more locations of the second token in each of the documents of the second listing, and a fourth mask that comprises a probabilistic representation of a set of integers that indicate a positional relationship between the second token and one or more other tokens in each of the documents of the second listing. For example, as previously discussed, the posting list module 230 of the mask-augmented inverted index search module 220 maps the token B to the second posting list 236. The mask module 240 of the mask-augmented inverted index search module 220 includes the masks 247, 249, and 242A that comprise the probabilistic representation of the set of integers corresponding to the one or more locations of token B in the documents 211-213. In one embodiment, the set of integers are summarized in a 4-bit array that represents the one or more file offset locations where the token B appears in the document.

As previously discussed, the mask module 240 of the mask-augmented inverted index search module 220 also includes the masks 248, 241A, and 243A that comprise the probabilistic representation of the set of integers that indicate a likely positional relationship between the token B and one or more other tokens in the documents 211-213 of the second posting list 236. In one embodiment, the positional relationship is the token that immediately follows the token B in the documents.

The method 400 includes rotating 415 the first mask by the positional relationship between the first token and the one or more other tokens. For example, as previously described the rotation module 250 of the mask-augmented inverted index search module 220 rotates the masks 241, 243, 245, and 248A to the left one bit as shown by the rotated masks 251-254.

The method 400 includes determining 420 if the rotated first mask is likely to have least one integer that is in common with the integers summarized by the third mask. For example, as previously described the first determination module 260 of the mask-augmented inverted index search module 220 determines if the rotated masks 251-254 of the token A are likely to have at least one integer in common with a respective mask 247, 249, 242A, 244A, and 246A of the token B. In one embodiment, the integer corresponds to a bit in a bit array that indicates that the rotated file offset location is the same as the file offset location of the token B.

The method 400 includes determining 425 if the second mask is likely to include an integer that represents the second token. For example, as previously described the determination module 270 of the mask-augmented inverted index search module 220 determines if the second masks 242, 244, 246, and 249A are likely to include an integer that represents the token B. In some embodiments, each integer may correspond to one bit of a four-bit array.

In some embodiments, the results module 280 of the mask-augmented inverted index search module 220 selects those documents of the first posting list 235 that have a rotated first mask that has at least one integer that is likely in common with the third mask and a second mask that likely includes an integer that represents the second token.

Figure 5:
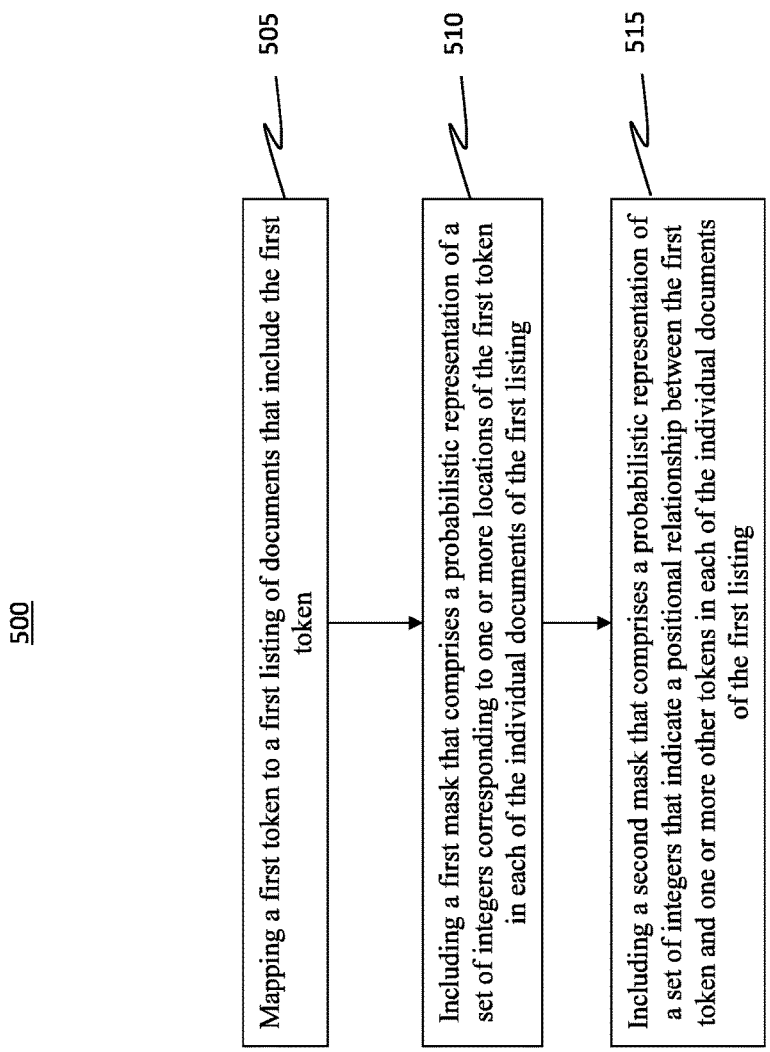
FIG. 5 illustrates a flowchart of an example method for generating a mask-augmented inverted index that is structured to allow phrase query searching while minimizing the amount of computing system processing and memory resources needed to generate the mask-augmented inverted index.

FIG. 5 illustrates a flow chart of an example method 500 for generating a mask-augmented inverted index that is structured to allow phrase query searching while minimizing the amount of computing system processing and memory resources needed to generate the mask-augmented inverted index. The method 500 will be described with respect to one or more of FIGS. 2-3 discussed previously.

The method 500 includes mapping 505 a first token to a first listing of documents that include the first token. For example, as previously discussed the posting list module 230 of the mask-augmented inverted index search module 220 maps the first token A to the first posting list 235.

The method 500 includes including 510 a first mask that comprises a probabilistic representation of a set of integers corresponding to one or more locations of the first token in each of the documents of the first listing. For example, as previously discussed the mask module 240 of the mask-augmented inverted index search module 220 includes the first masks 241, 243, 245, and 248A that comprise the probabilistic representation of the set of integers corresponding to the one or more locations of token A in the documents 211-214. In one embodiment, the set of integers are summarized by a 4-bit array implementing a Bloom filter that represent the file offset locations where the token A appears in the document.

The method 500 includes including 515 a second mask that comprises a probabilistic representation of a set of integers that indicate a positional relationship between the first token and one or more other tokens in each of the documents of the first listing. For example, as previously discussed the mask module 240 of the mask-augmented inverted index search module 220 includes the second masks 242, 244, 246, and 249A that comprises the probabilistic representation of the set of integers that indicate a likely positional relationship between the token A and one or more other tokens in the documents 211-214 of the first posting list 235. In one embodiment, the positional relationship is the token that immediately follows the token A in the documents.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for performing a phrase query search while minimizing the amount of computing system processing and memory resources needed for performing the phrase query search, the computing system comprising:
one or more processors; and
one or more computer-readable hardware storage devices having thereon computer-executable instructions that are structured such that, when executed by the one or more processors, cause the computing system to perform a phrase query search by performing the following:
receiving a search request, the search request comprising a phrase query search comprising two or more tokens that must appear in a specific position relative to each other;
for each of the two or more tokens, accessing a posting list for the each token wherein the posting list for the each token comprises a list of documents that include the each token, wherein each document in a posting list for the each token is associated with a mask that comprises a probabilistic representation of a set of integers corresponding to one or more locations of the each token in the associated document;
accessing a first mask that comprises a probabilistic representation of a set of integers corresponding to one or more locations of a first token in a corresponding document, each bit of the first mask representing one or more locations of the first token in the corresponding document, and accessing a second mask that comprises a probabilistic representation of a set of integers that indicate a positional relationship between the first token and one or more other tokens in the corresponding document;
accessing a third mask that comprises a probabilistic representation of a set of integers corresponding to one or more locations of the second token in the corresponding document, each bit of the third mask representing one or more locations of the second token in the corresponding document;
rotating the first mask by the positional relationship between the first token and the one or more other tokens indicated by the second mask;
comparing the rotated first mask with the third mask and determining if the rotated first mask is likely to have at least one integer that is in common with the integers of the third mask, the at least one common integer corresponding to a bit in a bit array that indicates that the rotated file location of the first token is the same as a file offset location of the second token;
in response to determining that the rotated first mask is likely to have at least one integer that is in common with the integers of the third mask, determining if the second mask is likely to include an integer that represents the second token; and
selecting those documents that have a rotated first mask that is likely to have at least one integer that is in common with the integers of the third mask and a second mask that is likely to include an integer that represents the second token.

2. The computing system of claim 1, wherein it is probable that the second token is immediately adjacent to the first token when it is determined that the rotated mask is likely to have at least one integer in common with the third mask and it is determined that the second mask is likely to include an integer that represents the second token.

3. The computing system of claim 1, wherein the second token is not immediately adjacent to the first token when it is determined that the rotated mask does not have any integers in common with the third mask or it is determined that the second mask does not include an integer that represents the second token.

4. The computing system of claim 1, wherein the first token and the second token are whole words.

5. The computing system of claim 1, wherein the first token and the second token are trigrams.

6. The computing system of claim 1, wherein the positional relationship between the first token and the one or more other tokens is immediately adjacent to the first token in each document of the first listing.

7. The computing system of claim 1, wherein the masks are implemented as 4 bit-Bloom filters.

8. A computing system for performing a phrase query search while minimizing the amount of computing system processing and memory resources needed for performing the phrase query search, the computing system comprising:
one or more processors; and
one or more computer-readable storage media having thereon computer-executable instructions that are structured such that, when executed by the one or more processors, cause the computing system to perform a phrase query search by performing the following:
receiving a search request, the search request comprising a phrase query search comprising two or more tokens that must appear in a specific position relative to each other;
mapping a first token to a first posting list of documents that include the first token; and
for each document in the first posting list of documents:
accessing a first mask comprising a set of integers that summarizes one or more file offset locations of the first token in the corresponding document, each bit of the first mask representing one or more locations of the first token in the corresponding document; and
accessing a second mask comprising a set of integers that summarizes all tokens that immediately follow the first token in the corresponding document; and
mapping a second token to a second posting list of documents that include the second token;
for each document in the second posting list of documents:
accessing a third mask comprising a set of integers that summarizes one or more file offset locations of the second token in the corresponding document, each bit of the third mask representing one or more locations of the second token in the corresponding document;
rotating the first mask;
comparing the rotated first mask with the third mask and determining if the rotated first mask is likely to have one integer that is in common with the integers of the third mask, the one common integer corresponding to a bit in a bit array that indicates that the rotated file location of the first token is the same as a file offset location of the second token;
in response to determining that the rotated first mask is likely to have at least one integer that is in common with the integers of the third mask, determining if the second mask is likely to include an integer that represents the second token; and selecting those individual documents of the first posting list of documents that have a rotated first mask that is likely to include at least one integer that is in common with the integers of the third mask and a second mask that is likely to include an integer that represents the second token.

9. The computing system of claim 8, wherein the one or more locations are file offset locations of the first token in each of the documents of the first listing.

10. The computing system of claim 8, wherein the one or more locations are line numbers where the first token is located in each of the documents of the first listing.

11. The computing system of claim 8, wherein the first token is a whole word.

12. The computing system of claim 8, wherein the first token is a sequence of characters.

13. The computing system of claim 12, wherein the sequence of characters is one of a bigram, a trigram, a 4-gram, an n-gram, a sequence of ASCII characters, a sequence of Unicode characters, or a UTF-8 sequence.

14. The computing system of claim 8, wherein the positional relationship between the first token and the one or more other tokens is immediately adjacent to the first token in each document of the first listing.

15. The computing system of claim 8, wherein the first and second masks are Bloom filters.

16. The computing system of claim 15, wherein the Bloom filters are implemented with four bits each.

17. The computing system of claim 8, wherein each individual document of the first and second listing of documents are one of source code files, web pages, emails, books, log files, office documents, or individual lines in a log file or a source code file.

* * * * *